(12) United States Patent
Dinh et al.

(10) Patent No.: US 7,964,329 B2
(45) Date of Patent: Jun. 21, 2011

(54) IMAGING MEMBER

(75) Inventors: Kenny-Tuan Dinh, Webster, NY (US); Dale S. Renfer, Webster, NY (US); Kendra M. Giza, Webster, NY (US); Michael L. Mehan, Rochester, NY (US); Susan M. Vandusen, Williamson, NY (US); Markus R. Silvestri, Fairport, NY (US); John F. Yanus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 46 days.

(21) Appl. No.: 12/501,635

(22) Filed: Jul. 13, 2009

(65) Prior Publication Data

US 2009/0269689 A1 Oct. 29, 2009

Related U.S. Application Data

(62) Division of application No. 11/359,066, filed on Feb. 22, 2006, now Pat. No. 7,572,561.

(51) Int. Cl.
*G03G 5/147* (2006.01)

(52) U.S. Cl. .......................................... 430/66; 430/132

(58) Field of Classification Search ................... 430/66, 430/132
See application file for complete search history.

(56) References Cited

U.S. PATENT DOCUMENTS

| 3,121,006 | A | | 2/1964 | Middleton et al. |
| 4,298,697 | A | | 11/1981 | Baczek et al. |
| 4,338,390 | A | | 7/1982 | Lu |
| 4,390,609 | A | * | 6/1983 | Wiedemann ................. 430/58.5 |
| 4,560,635 | A | | 12/1985 | Hoffend et al. |
| 4,871,634 | A | | 10/1989 | Limburg et al. |
| 4,970,131 | A | * | 11/1990 | Taniguchi et al. ............. 430/67 |
| 5,503,935 | A | * | 4/1996 | Patel ............................ 428/412 |
| 6,010,810 | A | | 1/2000 | Uesaka et al. |
| 7,147,978 | B2 | * | 12/2006 | Zhu et al. ........................ 430/66 |
| 2005/0064202 | A1 | | 3/2005 | Graham et al. |
| 2005/0153230 | A1 | | 7/2005 | Koyanagi et al. |
| 2007/0072101 | A1 | * | 3/2007 | Dinh et al. ...................... 430/66 |
| 2007/0166634 | A1 | | 7/2007 | Qi et al. |
| 2008/0193866 | A1 | | 8/2008 | Dinh et al. |

* cited by examiner

*Primary Examiner* — Satya B Sastri
(74) *Attorney, Agent, or Firm* — Fay Sharpe LLP

(57) ABSTRACT

An imaging member with a unique overcoat composition adapted for forming protective, scratch-resistant overcoats is disclosed. The overcoat composition comprises a binder component that includes particular proportions of a acrylated polyol and propylene glycol. The overcoat composition also comprises a transport agent and a crosslinking agent.

15 Claims, 1 Drawing Sheet

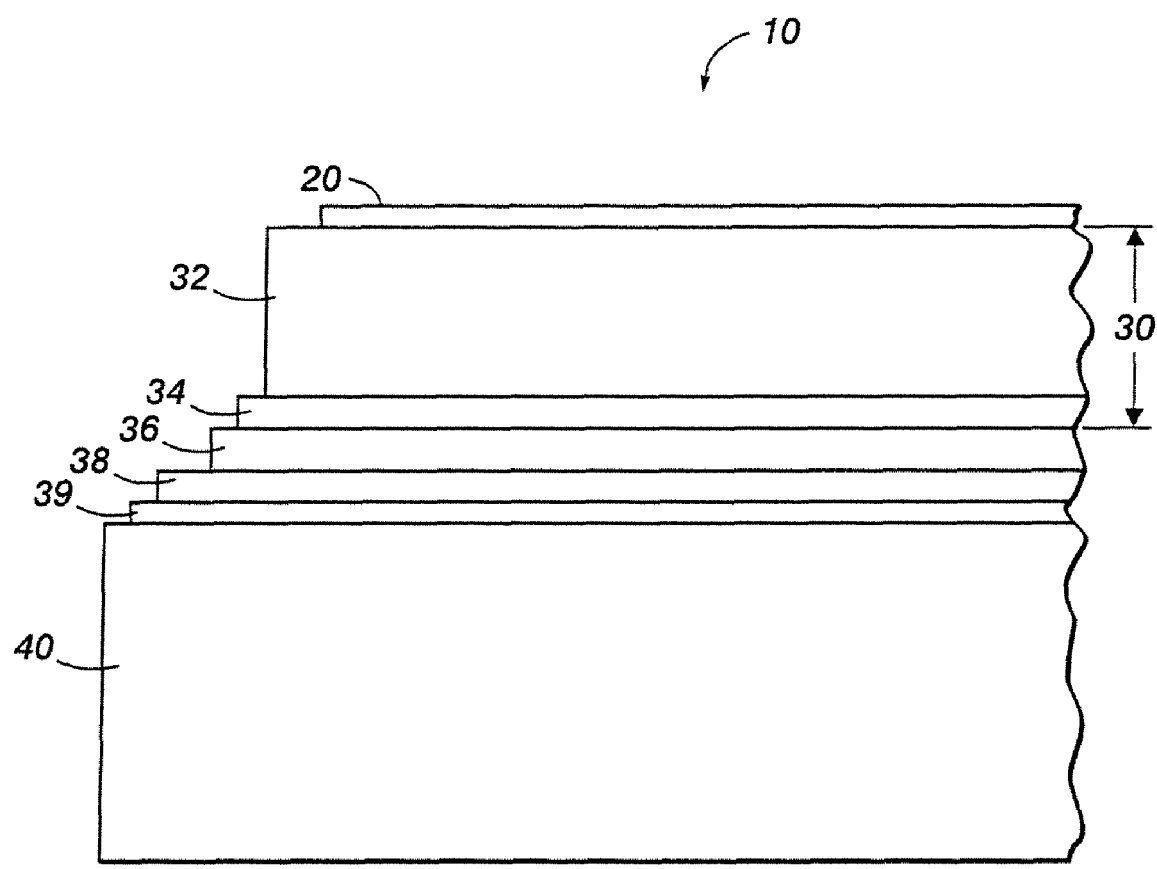

IMAGING MEMBER

CROSS-REFERENCE TO RELATED APPLICATIONS

This application is a divisional of U.S. patent application Ser. No. 11/359,066, filed Feb. 22, 2006, which is fully incorporated herein in its entirety by reference.

This application is also related to U.S. patent application Ser. No. 11/705,932, filed Feb. 13, 2007, which is fully incorporated herein in its entirety by reference.

BACKGROUND

The present disclosure, in various exemplary embodiments, relates to electrophotographic imaging members and, more specifically, to layered photoreceptor structures with improved overcoat layers and processes for making the imaging members. For example, one exemplary embodiment relates to a particular overcoat composition for producing a high quality surface finish.

Electrophotographic imaging members, i.e. photoreceptors, typically include a photoconductive layer formed on an electrically conductive substrate. The photoconductive layer is an insulator in the dark so that electric charges can be retained on its surface. Upon exposure to light, the charge is dissipated.

An electrostatic latent image is formed on the photoreceptor by first uniformly depositing an electric charge over the surface of the photoconductive layer by one of the many known means in the art. The photoconductive layer functions as a charge storage capacitor with charge on its free surface and an equal charge of opposite polarity on the conductive substrate. A light image is then projected onto the photoconductive layer. The portions of the layer that are not exposed to light retain their surface charge. After development of the latent image with toner particles to form a toner image, the toner image is usually transferred to a receiving substrate, such as paper.

Imaging members can have a number of different configurations. For example, they can comprise a flexible member, such as a flexible scroll or a belt containing a flexible substrate support. The flexible member belt may be seamed or unseamed. The electrostatographic imaging members can also be a rigid member, such as those utilizing a rigid support substrate drum. Drum imaging members have a rigid cylindrical supporting substrate bearing one or more imaging layers. The use of such small diameter drums or flexible imaging belts places a premium on photoreceptor life.

In certain imaging applications, blades or other flexible members are used to clean film and debris off the surface of a photoreceptor belt. Debris such as carrier beads, toner agglomerates or paper dust, removed from the photoreceptor belt, typically detach from the edge of the blade or flexible member and are captured by a cleaner brush or other component. However, not all debris is removed from the blade. And thus, a portion of the debris remains at the interface of the blade and photoreceptor. As the blade wears, the tip pressure of the blade often decreases resulting in further entrainment of debris along the edge or tip of the blade. Debris trapped along the blade can scratch or otherwise cause abrasive action on the surface of the photoreceptor. If the abrasive action is sufficiently severe, cracking of the outermost surface of the photoreceptor can also occur. The resulting scratches, if sufficiently significant, can cause a variety of printing defects, and can cause unwanted marks in a printed image. Accordingly, there is a need for a strategy to prevent, or at least reduce, the potential for scratch-induced printing defects or in severe cases, cracking of a photoreceptor surface.

INCORPORATION BY REFERENCE

The disclosures of U.S. Pat. Nos. 4,871,634; 4,560,635; 4,298,697; 4,338,390; and 3,121,006 are incorporated herein by reference in their entirety.

BRIEF DESCRIPTION

In a first aspect, the exemplary embodiment provides an imaging member having an overcoat composition comprising a binder component that includes (i) an acrylated polyol, and (ii) a polypropylene glycol, in which the proportion of the acrylated polyol to the polypropylene glycol ranges from about 1:9 to about 9:1 by weight. The overcoat composition also comprises at least one transport agent and at least one crosslinking agent.

In another aspect, the exemplary embodiment provides an overcoat composition comprising an acrylated polyol having a hydroxyl number of from about 10 to about 600, a polypropylene glycol having a molecular weight of from about 100 to about 20,000, a transport agent, and a crosslinking agent.

In yet another aspect, the exemplary embodiment provides a method for producing a photoreceptor having a protective overcoat layer. The method comprises providing a photoreceptor having an exposed receiving surface. The method also comprises providing an overcoat composition comprising (i) a binder component including an acrylated polyol and a polypropylene glycol, (ii) a transport agent, and (iii) a crosslinking agent. The method additionally comprises dispersing the overcoat composition in a solvent system to produce an overcoat coating solution. The method also comprises applying the overcoat coating solution onto the receiving surface of the photoreceptor.

In a further aspect, the exemplary embodiment provides a photoreceptor having a protective overcoat layer.

These and other non-limiting features or characteristics of the disclosure are more particularly disclosed below.

BRIEF DESCRIPTION OF THE DRAWINGS

The following is a brief description of the drawings, which is presented for the purposes of illustrating the disclosures set forth herein and not for the purpose of limiting the same.

The FIGURE is a schematic illustration of an exemplary embodiment photoreceptor including an exemplary embodiment overcoat layer.

DETAILED DESCRIPTION

The exemplary embodiment provides overcoat compositions that can be applied or otherwise deposited onto a photoreceptor or other imaging member to provide a protective surface or coating. The overcoat compositions are particularly resistant to cracking and scratching. When deposited or otherwise applied to a photoreceptor surface, the overcoat composition prevents, or at least significantly reduces the potential for, the surface being scratched, such as due to abrasive contact with carrier beads, toner particles or agglomerates. In addition, the overcoat composition, when applied onto a photoreceptor surface, provides charge movement through the layer without image deterioration due to persistent conductivity [lateral charge migration (LCM)]. The overcoat composition, when applied onto a photoreceptor surface, also provides superior mechanical life including corona and flexing life, and provides excellent electrical properties to the resulting assembly.

Also included within the scope of the present disclosure are methods of imaging and printing with the photoresponsive devices described herein. These methods generally involve the formation of an electrostatic latent image on the imaging member, followed by developing the image with a toner composition comprised, for example, of thermoplastic resin, colorant, such as pigment, charge additive, and surface additives, referenced in U.S. Pat. Nos. 4,560,635; 4,298,697; and 4,338,390 for example, subsequently transferring the image to a suitable substrate, and permanently affixing the image thereto.

A more complete understanding of the processes and apparatuses disclosed herein can be obtained by reference to the accompanying drawing. This FIGURE is merely a schematic representation based on convenience and the ease of demonstrating the present development, and is, therefore, not intended to indicate relative size and dimensions of an imaging device or components thereof.

The FIGURE schematically illustrates a photoreceptor 10 including an overcoat layer 20 formed from an exemplary embodiment overcoat composition as described herein. The overcoat layer 20 is disposed on a photoconductive layer 30, which is disposed on an electrically conductive substrate 40 or other member. The overcoat layer 20 is applied to the photoconductive layer 30 by dispersing the overcoat solids or overcoat composition onto layer 30. Optional layers, further described herein, are also shown.

The substrate 40 may be opaque or substantially transparent and may comprise any suitable material having the required mechanical properties. Accordingly, the substrate may comprise a layer of an electrically non-conductive or conductive material such as an inorganic or an organic composition. Various resins may be employed as non-conductive materials including polyesters, polycarbonates, polyamides, polyurethanes, and the like, which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like.

The thickness of the substrate layer depends on numerous factors, including strength and desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness, e.g., less than 50 micrometers, provided there are no adverse effects on the final electrophotographic device.

In embodiments where the substrate layer is not conductive, the surface thereof may be rendered electrically conductive by an electrically conductive coating 39. The conductive coating may vary in thickness over substantially wide ranges depending upon the optical transparency, degree of flexibility desired, and economic factors. Accordingly, for a flexible photoresponsive imaging device, the thickness of the conductive coating may be from about 20 angstroms to about 750 angstroms, and more preferably from about 100 angstroms to about 200 angstroms for an optimum combination of electrical conductivity, flexibility, and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium and hafnium, titanium, nickel, stainless steel, chromium, tungsten, molybdenum, and the like.

An optional hole blocking layer 38 may be applied to the substrate 40 or the electrically conductive coating 39. Any suitable and conventional blocking layer capable of forming an electronic barrier to holes between the adjacent photoconductive layer and the underlying conductive surface of a substrate may be utilized.

An optional adhesive layer 36 may be applied to the hole blocking layer 38. Any suitable adhesive layer may be utilized and such adhesive layer materials are well known in the art. Typical adhesive layer materials include, for example, polyesters, polyurethanes, and the like. Satisfactory results may be achieved with adhesive layer thickness from about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying, and the like.

At least one electrophotographic imaging layer 30 is formed on the adhesive layer, blocking layer, or substrate. The electrophotographic imaging layer may be a single layer that performs both charge generating and charge transport functions, as is well known in the art, or it may comprise multiple layers such as a charge generator layer 34 and charge transport layer 32. Charge generator (also referred to as photogenerating) layers may comprise amorphous films of selenium and alloys of selenium and arsenic, tellurium, germanium and the like, hydrogenated amorphous silicon and compounds of silicon and germanium, carbon, oxygen, nitrogen, and the like fabricated by vacuum evaporation or deposition. The charge generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakisazos; and the like dispersed in a film forming polymeric binder and fabricated by solvent coating techniques. Illustrative organic photoconductive charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene bisimide pigments; indigo pigments such as indigo, thioindigo, and the like; bisbenzoimidazole pigments such as Indofast Orange toner, and the like; phthalocyanine pigments such as titanyl phthalocyanine, aluminochlorophthalocyanine, hydroxygalliumphthalocyanine, and the like; quinacridone pigments; or azulene compounds. Suitable inorganic photoconductive charge generating materials include for example cadmium sulfide, cadmium sulfoselenide, cadmium selenide, crystalline and amorphous selenium, lead oxide and other chalcogenides. Alloys of selenium are encompassed by embodiments of the disclosure and include for instance selenium-arsenic, selenium-tellurium-arsenic, and selenium-tellurium.

Phthalocyanines have been employed as photogenerating materials for use in laser printers utilizing infrared exposure systems. Infrared sensitivity is required for photoreceptors exposed to low cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine, magnesium phthalocyanine, and metal-free phthalocyanine. The phthalocyanines exist in many crystal forms, which have a strong influence on photo-generation.

Any suitable polymeric film forming binder material may be employed as the matrix in the charge generating (photogenerating) binder layer. Typical polymeric film forming materials include those described, for example, in U.S. Pat. No. 3,121,006. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrenealkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder. In embodiments, preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be utilized to mix and thereafter apply the photogenerating layer coating mixture. Typical application techniques include spraying, dip coating, roll coating, wire wound rod coating, vacuum sublimation, and the like. For some applications, the generator layer may be fabricated in a dot or line pattern. Removing the solvent of a solvent coated layer may be effected by any suitable conventional technique such as oven drying, infrared radiation drying, air drying and the like.

In fabricating a photosensitive imaging member, a charge generating material (CGM) or pigment, wherein the terms "pigment" and "charge generating material" are used interchangeably, and a charge transport material (CTM) may be deposited onto the substrate surface either in a laminate type configuration where the CGM and CTM are in different layers or in a single layer configuration where the CGM and CTM are in the same layer along with a binder resin. A photoreceptor can be prepared by applying over the electrically conductive layer the charge generation layers and a charge transport layer. In embodiments, the charge generating layer and the charge transport layer may be applied in any order.

In embodiments, the charge generating layer adjacent to the charge transporting layer is partially trapping to charges generated in the other charge generating layer(s) which are passing through this layer to the charge transporting layer. Normally, the above photoexcited charges are holes so the generation layer adjacent to the transport layer must be partially trapping to holes transiting through it, but if the transport layer transports electrons it would be electron trapping. This functionality can be in the pigment itself, that is, the pigment may be a good electron transporter but a poor hole transporter. Such pigments are sometimes referred to as extrinsic pigments because they require the presence of hole transport molecules, i.e., electron donor molecules. Examples of extrinsic electron transporting pigments are perylene and azo pigments and their derivatives. The degree of hole trapping can be controlled by introducing hole transport molecules either directly or by diffusion from the charge transport layer. Examples of charge transport materials are listed below. Alternatively or in combination, additives can be used to increase the charge trapping. Thus in case of ambipolar, also referred to as intrinsic, pigments such as phthalocyanines, trapping additives in combination with charge transport molecules can be added. Suitable additives are other charge transport materials whose energy levels are 0.2 eV different from the primary charge transport molecule.

Charge transport materials include an organic polymer or non-polymeric material capable of supporting the injection of photoexcited holes or transporting electrons from the photoconductive material and allowing the transport of these holes or electrons through the organic layer to selectively dissipate a surface charge. Illustrative charge transport materials include, for example, a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methyl pyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly(vinylpyrene); poly(-vinyltetraphene); poly(vinyltetracene) and poly(vinylperylene). Typical charge transporting small molecules include, for example, pyrazolines such as 1-phenyl-3-(4'-diethylamino styryl)-5-(4"-diethylamino phenyl) pyrazoline, diamines such as N,N'-diphenyl-N,N'-bis(3-methylphenyl)-(1,1-biphenyl)-4,4'-diamine, hydrazones such as N-phenyl-N-methyl-3-(9-ethyl) carbazyl hydrazone and N,N-diethyl amino benzaldehyde-1,2-diphenyl hydrazone, and oxadiazoles such as 2,5-bis (4-N,N'-diethylaminophenyl)-1,2,4-oxadiazole, stilbenes and the like. Suitable electron transport materials include electron acceptors such as 2,4,7-trinitro-9-fluorenone; 2,4,5,7-tetranitrofluorenone; dinitroanthracene; dinitroacridene; tetracyanopyrene and dinitroanthraquinone, biphenylquinone derivatives and phenylquinone derivatives.

An example of such a charge transport compound is an aromatic amine represented by the following molecular formula:

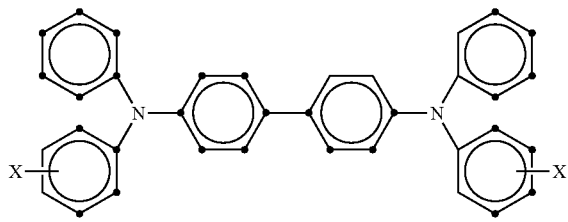

wherein X is a linear or branched alkyl having from one to 12 carbon atoms, preferably from one to 6 carbon atoms. In specific embodiments, X is a methyl group in the meta or para position.

Any suitable inactive resin binder with the desired mechanical properties may be employed in the charge transport layer. Typical inactive resin binders soluble in methylene chloride include polycarbonate resin, polyvinylcarbazole, polyester, polyarylate, polystyrene, polyacrylate, polyether, polysulfone, and the like. Molecular weights can vary from about 20,000 to about 1,500,000.

Any suitable technique may be utilized to apply the charge transport layer and the charge generating layers. Typical application techniques include spraying, dip coating, roll coating, wire wound rod coating, vacuum coating, and the like. Drying of the deposited coating may be effected by any suitable conventional technique such as oven drying, infrared radiation drying, air drying and the like. Generally, the thickness of each charge generating layer ranges from about 0.1 micrometer to about 3 micrometers and the thickness of the transport layer is from about 5 micrometers to about 100 micrometers, but thicknesses outside these ranges can also be used. The thickness of the charge generating layer adjacent to the charge transport layer is selected so that the required fraction of the charge is trapped resulting in the desired voltage. The desired thickness is then governed by the fraction of charge transiting the charge generating layer adjacent to the charge transport layer. In general, the ratio of the thickness of the charge transport layer to the charge generating layer is preferably maintained from about 2:1 to 200:1 and in some instances as great as 400:1.

The exemplary embodiment overcoat 20 comprises (i) a binder component, which includes an acrylated polyol and a polypropylene glycol (PPG), (ii) a transport agent, and (iii) a crosslinking agent. The exemplary embodiment overcoat compositions can further comprise a solvent or solvent system to facilitate application of the overcoat composition onto a receiving surface. In order for charges to transport through the overcoat, an alcohol soluble hole transport molecule such as N,N'-diphenyl-N,N'-bis(3-hydroxyphenyl)-[1,1'-biphenyl]-4,4'-diamine (also known as DHTBD) can be used as the transport agent. To crosslink the acrylated polyol, a methylated, butylated melamine formaldehyde crosslinking agent can be used with an acid catalyst such as, for example, toluenesulfonic acid. PPG is utilized to increase flexibility of the resulting overcoat while the polyol imparts toughness and hardness characteristics to the overcoat for scratch resistance and LCM resistance.

The combination of binders for use in the exemplary embodiment overcoat composition includes at least one acrylated polyol and at least one polypropylene glycol (PPG), each as described herein. The one or more acrylated polyols each have a hydroxyl number (also known as "—OH number") of from about 10 to about 600. In specific embodiments, the one or more acrylated polyols have a hydroxyl number from about 50 to about 200. Generally, if the hydroxyl number is too low, the resulting overcoat layer may exhibit undesirable brittleness. Conversely, if the hydroxyl number is too high, then the overall toughness of the resulting overcoat layer may be reduced. The term "hydroxyl number" as used herein, is the number of reactive hydroxyl (—OH) groups available for reaction. This number is expressed as the weight of hydroxyl groups (as milligrams of potassium hydroxide) equivalent to the hydroxyl groups in a 1.0 gram sample of the noted acrylated polyol. This term is a measure of the concentration of hydroxyl groups in the polymer chain. This term may be measured for example, by a method such as one of the ASTM D 4274 methods. Examples of two commercially available acrylated polyols for use in the exemplary embodiment overcoat composition are POLYCHEM 7558-B-60 from OPC Polymers; and JONCRYL 510 from Johnson Polymer.

The one or more PPG's for use in the binder component of the exemplary embodiment overcoat composition each have a molecular weight (MW) of from about 100 to about 20,000. In specific embodiments, the one or more PPG's have a MW of from about 400 to about 5,000. Generally, if the molecular weight of the PPG is too high, certain physical properties, i.e. the mechanical properties such as strength and toughness, are detrimentally reduced. If the molecular weight of the PPG is too low, the resulting overcoat layer can become excessively brittle and prone to cracking. Examples of two commercially available PPG's for use in the exemplary embodiment overcoat composition are polypropylene glycols having MW's of 425 and 2000, available from Sigma-Aldrich Chemical Co.

In one specific embodiment, the one or more acrylated polyols have a hydroxyl number from about 50 to about 200 and the one or more PPG's have a MW of from about 400 to about 5,000.

The one or more acrylated polyols and one or more PPG's are added together in particular proportions to form the binder component of the exemplary embodiment overcoat composition. The weight ratio of the acrylated polyol(s) to the PPG(s) ranges from about 1:9 to about 9:1, and particularly from about 2:8 to about 8:2. In specific embodiments, the weight ratio of the acrylated polyol to the PPG in the binder component is 4:6; 6:4; or 8:2. These weight ratios are expressed as the weight amount of acrylated polyol to that of PPG. Thus, for example, the weight ratio of 1:9 represents 1 gram of acrylated polyol to 9 grams of PPG.

Two or more acrylated polyols can be used in the binder component so long as the proportion of the total amount of acrylated polyol in the binder component is within the previously noted ranges. Similarly, two or more PPG's can be used in the binder component so long as the proportion of the total amount of PPG in the binder component is within the previously noted ranges.

The exemplary embodiment overcoat composition also includes one or more transport agents. Any suitable hole transport material may be used in the overcoating layer. For example, suitable transport agents for use in the exemplary embodiment overcoat composition generally include phenolic substituted aromatic amines, primary alcohol substituted aromatic amines, and combinations thereof. As previously noted, DHTBD is an example of a suitable transport agent. The one or more selected transport agents should ideally be soluble in polar solvents such as alcohols.

In specific embodiments, the hole transport material may be an alcohol-soluble polyhydroxy diarylamine small molecule hole transport material having at least two hydroxyl functional groups. Such small molecule hole transport materials are described in U.S. Pat. No. 4,871,634, the entirety of which is herein incorporated by reference. In specific embodiments, the small molecule hole transport material can be represented by the following formula:

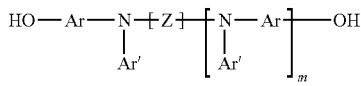

wherein:

m is 0 or 1;

Z is selected from the group consisting of:

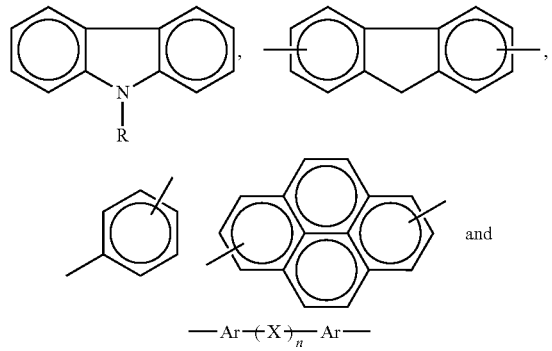

n is 1 or 1;

Ar is selected from the group consisting of:

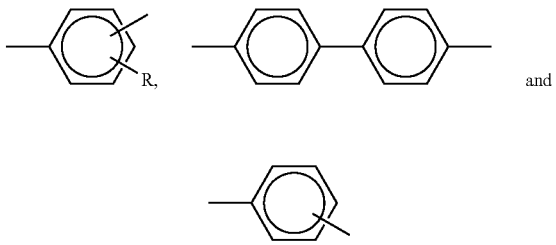

R is selected from the group consisting of —CH$_3$, —C$_2$H$_5$, —C$_3$H$_7$, and —C$_4$H$_9$;

Ar' is selected from the group consisting of:

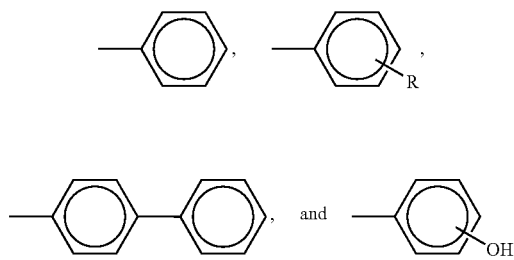

X is selected from the group consisting of:

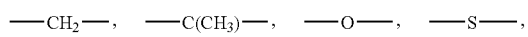

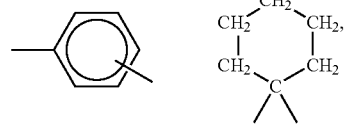

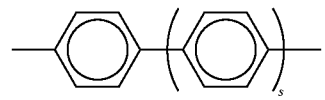

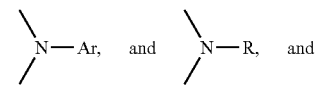

s is 0, 1 or 2;

the dihydroxy arylamine compound preferably being free of any direct conjugation between the —OH groups and the nearest nitrogen atom through one or more aromatic rings.

The expression "direct conjugation" is defined as the presence of a segment, having the formula —(C═C)n-C═C— in one or more aromatic rings directly between an —OH group and the nearest nitrogen atom. Examples of direct conjugation between the —OH groups and the nearest nitrogen atom through one or more aromatic rings include a compound containing a phenylene group having an —OH group in the ortho or para position (or 2 or 4 position) on the phenylene group relative to a nitrogen atom attached to the phenylene group or a compound containing a polyphenylene group having an —OH group in the ortho or para position on the terminal phenylene group relative to a nitrogen atom attached to an associated phenylene group.

In specific embodiments, the hydroxyl functionalized aromatic diamine compound is N,N'-diphenyl-N,N'-bis(3-hydroxyphenyl)-[1,1'-biphenyl]-4,4'-diamine and is represented by the formula:

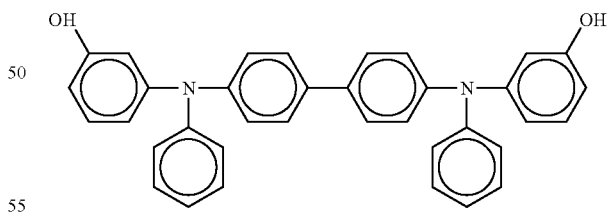

The exemplary embodiment overcoat composition also includes one or more crosslinking agents. The crosslinking agent serves to crosslink the acrylated polyol(s) in the binder component. Specifically, the crosslinking agent serves to crosslink the hydroxyl-containing materials, i.e. the acrylated polyol binder, the PPG binder, and the transport agent such as DHTBD. An example of a suitable crosslinking system is a methylated, butylated melamine formaldehyde crosslinking agent such as CYMEL 1130 used in conjunction with an acid catalyst, such as for example p-toluenesulfonic acid.

After curing, the binder is a cured acrylated polyol represented by the formula:

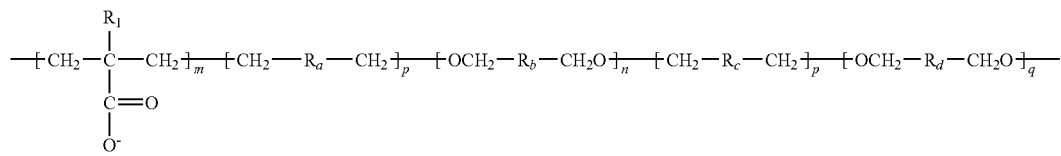

wherein $R_1$ is linear alkyl; wherein $R_a$ and $R_c$ are independently selected from linear alkyl, linear alkoxy, branched alkyl, or branched alkoxy, the alkyl or alkoxy groups having from 1 to about 20 carbon atoms; wherein $R_b$ and $R_d$ are independently selected from linear alkyl and linear alkoxy, the alkyl or alkoxy groups having from 1 to about 20 carbon atoms; and wherein m, n, p, and q represent mole fractions from 0 to 1, such that m+n+p+q =1. In specific embodiments, m, n, p, and q are each greater than 0.

The overcoat 20 may include any suitable overcoat material additive. The overcoat 20 may be applied by dispersing the overcoat composition in a solvent system. Examples of suitable solvents or solvent systems include, but are not limited to secondary or tertiary alcohols such as 2-propanol, 1-methoxy-2-propanol, 2-butanol, 3-butanol and the like. Primary alcohols are generally not utilized since they tend to interfere with the crosslinking process.

The thickness of the continuous overcoat layer selected depends upon the abrasiveness of the charging (e.g., bias charging roll), cleaning (e.g., blade or web), development (e.g., brush), transfer (e.g., bias transfer roll), etc., in the system employed. Its thickness can range from about 1 or 2 microns up to about 10 or 15 microns or more. In specific embodiments, the overcoat composition described herein has a thickness of from about 0.1 microns to about 8 microns, and more specifically from about 1 micron to about 5 microns.

The exemplary embodiment also provides a method for depositing or otherwise forming an overcoat layer on a photoreceptor, and specifically, on a photoconductive layer of such a photoreceptor. The exemplary embodiment can include preparing an overcoat coating solution by dispersing an appropriate overcoat composition in a solvent system such that the weight percent solids is from about 4% to about 40%, and more specifically from about 10% to about 25%. The resulting overcoat coating solution serves as a precursor for depositing or otherwise forming an overcoat layer, such as on a photoreceptor. The resulting overcoat coating solution is then applied onto a receiving surface, such as an exposed surface of a photoconductive layer 30, such as depicted in the FIGURE. After deposition of the overcoating formulation, the overcoat coating solution is dried by removing at least substantially all of the solvent system. Removal can be performed by evaporation of the solvent system. Evaporation can be in the form of flash evaporation. Removal is performed to thereby produce an overcoat layer, such as layer 20 in the FIGURE.

The exemplary embodiment also provides an imaging member such as a photoreceptor having an overcoat as described herein.

Any suitable and conventional technique may be utilized to mix and thereafter apply the overcoat layer coating mixture to the photoreceptor assembly. Typical application techniques include spraying, dip coating, roll coating, wire wound rod coating, and the like. Drying of the deposited coating may be effected by any suitable conventional technique such as oven drying, infrared radiation drying, air drying and the like.

Any suitable drying system may be utilized for drying the coatings. A forced air oven is preferred because of rapid drying and safety concerns. Preferably, drying is effected by impingement of air streams directed against the exposed surface of the overcoating layer. Optimum results are achieved when the paths of the air streams are substantially perpendicular to the coated surface. For drums, the air stream paths are perpendicular to an imaginary tangent to the curved surface of the drum and perpendicular to the imaginary axis of the drum. Preferably, the air streams have a velocity of from about 1 cm per second to about 100 cm per second. The air stream velocity should be maintained at a velocity below that which would distort the deposited undried charge transport layer coating and undried overcoat layer coating. Preferably, the drying of the combination of undried transport layer coating and undried overcoat layer coating is a ramped function in which the final temperature of drying is typically arrived at, for example, after about 25 minutes. Alternatively, drying can be accomplished in multiple steps such as, for example, a lower temperature (e.g., from about 80° C. and 90° C. for about 25 minutes) followed by a final temperature (e.g., from about 110° C. and about 120° C. for 30 minutes). This allows the transport layer solvent to escape before the overcoat layer dries or cross links to form a barrier to solvent migration from the charge transport layer. When a cross linkable polyamide is employed in the overcoat layer, the polyamide crosslinks and is insoluble in alcohol by about the time drying and curing is completed. Such cross linked polymer is a barrier to solvent migration from the transport layer.

The dried overcoating of the present disclosure should transport holes during imaging and should not have too high a free carrier concentration. Free carrier concentration in the overcoat increases the dark decay. Preferably the dark decay of the device having the overcoat layer should be about the same as that of the unovercoated device.

The dried overcoat layer includes from about 10 to about 90 percent by weight of the binder component, and from about 90 to about 10 percent by weight of the transport agent, the weights based on the total weight of the dried overcoat layer. For example, in embodiments, the transport agent is incorporated into the overcoat layer in an amount of from about 20 to about 70 percent by weight, or from about 30 to about 50, preferably about 33 percent by weight. As desired, the overcoat layer can also include other materials, such as conductive fillers, abrasion resistant fillers, and the like, in any suitable and known amounts.

The photoreceptor of the exemplary embodiment may be used in any conventional electrophotographic imaging system such as copiers, duplicators, printers, facsimile and multifunctional systems. As described herein, electrophotographic imaging usually involves depositing a uniform electrostatic charge on the photoreceptor, exposing the photoreceptor to a light image pattern to form an electrostatic latent image on the photoreceptor, developing the electrostatic latent image with electrostatically attractable marking particles to form a visible toner image, transferring the toner image to a receiving member and repeating the depositing, exposing, developing and transferring steps at least once.

The development of the present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLE 1

Sample Preparation:

Two acrylated polyols, with different hydroxyl numbers (OH number), were tested in this embodiment. The two acrylated polyols were JONCRYL 510 from Johnson Polymer (OH number=140) and POLYCHEM 7558-B-60 from OPC Polymers (OH number=40). These two acrylated polyols were tested with polypropylene glycols (PPG) with different molecular weights (MW=425 and 2000) from Sigma-Aldrich.

Three different binder ratios between acrylated polyol and PPG were selected. A total of 12 different overcoat compositions were made as shown in Table 1 below. All proportions are by weight unless otherwise indicated. Each acrylated polyol and PPG mixture totaling 1 gram was dissolved in 6 grams of DOWANOL PM [1-methoxy-2-propanol]. 0.8 g of DHTBD, 0.6 gram CYMEL 1130 and 0.5 grams of an 8% p-toluenesulfonic acid/DOWANOL PM solution were added to the mixture to complete an overcoat solution.

Each of these overcoat compositions was hand-coated on a standard photoreceptor belt using a ⅛ mil bar to create an overcoat layer of about 2 to 5 microns in thickness. The wet films were dried for 2 minutes in a forced air oven at 125° C.

TABLE 1

| Acrylated Polyol | PPG | Weight Ratio of Acrylated Polyol to PPG | Crack | LCM | Scratch |
|---|---|---|---|---|---|
| B60 | PPG 2K | 8:2 | 4.5 | 3 | 4 |
| B60 | PPG 425 | 8:2 | 4 | 3 | 4 |
| J510 | PPG 2K | 8:2 | 4 | 3 | 4 |
| J510 | PPG 425 | 8:2 | 4 | 3 | 4 |
| B60 | PPG 2K | 6:4 | 4.5 | 5 | 3 |
| B60 | PPG 425 | 6:4 | 4 | 3 | 3 |
| J510 | PPG 2K | 6:4 | 4.5 | 4 | 4 |
| J510 | PPG 425 | 6:4 | 4.5 | 3 | 3 |
| B60 | PPG 2K | 4:6 | 5 | 4 | 3 |
| B60 | PPG 425 | 4:6 | 5 | 4 | 3 |
| J510 | PPG 2K | 4:6 | 3.5 | 3.5 | 3 |
| J510 | PPG 425 | 4:6 | 4 | 3 | 3 |
| Non-Overcoated Control Photoreceptor Belt | | | 3 | 4 | 1 |

In Table 1, B60 is POLYCHEM 7558-B-60 from OPC Polymers; J510 is JONCRYL 510 from Johnson Polymer; PPG 2K is polypropylene glycol with a molecular weight of 2000 and PPG 425 is polypropylene glycol with a molecular weight of 425 available from Sigma-Aldrich. B60 is commercially available as a solution at 60% loading. Therefore, 1 gram of B60 solution is used to yield 0.6 grams of B60 polymer. Ratings assigned to Crack, LCM (lateral charge migration) and Scratch are noted below. A rating of 1 is considered to be the worst and 5 being the best.

Electrical Test

Each device from the overcoat photoreceptor belts from Example 1 was mounted in a motionless electrical scanner. Each was charged to a negative potential of 500 V. Once the initial charging potential was measured, the sample was then exposed to monochromatic radiation of known intensity. Finally, the sample was exposed to an erase lamp of appropriate intensity and wavelength. The potential after erase and any residual potential were then measured. Samples were electrically measured in B zone condition (72° F., 50% humidity). For the reference, a control photoreceptor belt was also measured for its electrical characteristics. None of the exemplary embodiment overcoats imposed any increase in residual voltage or any change in electrical sensitivity at 2.1 ergs. Throughout 10,000 cycles of electrical cycling, any change in residual voltage of the overall device was due to the device underneath but not the added overcoat.

Scratch Resistance Test

Overcoat samples were cut into strips of 1 inch in width by 12 inches in length and were flexed in a tri-roller flexing system. Each belt was under a 1.1 lb/inch tension and each roller was ⅛ inches in diameter. A polyurethane "spots blade" was placed in contact with each belt at an angle between 5 and 15 degrees. Carrier beads of about 100 micrometers in size were attached to the spots blade by the aid of double tape. Belts were flexed for 200 cycles. The surface morphology of each scratched area was then analyzed. Rq, the root mean square roughness, was chosen to be the standard metric for scratch resistance assessment. A rating of 1 being the worst, is for Rq greater than 0.3 microns, 2 for Rq between 0.2 and 0.3 micron, 3 for Rq between 0.15 and 0.2, 4 for Rq between 0.1 and 0.15 and 5 being the best scratch resistance is for Rq less than 0.1 micron. For comparison, a non-overcoated control photoreceptor belt exhibited a scratch resistance rating of 1. All exemplary embodiment overcoated belts exhibited superior scratch resistance rating of 3 to 4.

Running Lateral Charge Migration Test

Overcoated samples were cut into strips and then mounted on a drum to be scanned in a motionless electrical scanner. For each cycle, samples were charged to a negative potential of 500V and then discharged and erased. Samples were continuously charged and discharged for 10,000 cycles. During these electrical cycles, samples were also exposed to corona effluents. After 10,000 cycles, overcoat samples were immediately printed using a DC 12 Limoges printer. The drum was printed with a target containing various types of bit lines for LCM deletion. The target print had 5 different bit lines ranging from 1 bit to 5 bit. The sample with the least number of visible lines was badly affected by corona effluence and electrical charging and concluded to be completely deleted if there were no visible lines. A rating of 1 was designated to be the worst with no visible line or 1 visible line, and a rating of 5 was the best for 5 visible lines. None of the exemplary embodiment overcoat belts altered the running LCM resistance property of the overall device.

Crack Resistance Test

Twelve overcoated belt samples were cut into strips of 1 inch in width by 12 inches in length and were tested for mechanical crack resistance, by being flexed on a tri-roller fixture with ¼ inch diameter rolls for 5,000 cycles. Cracks could be formed on the overcoat but not deep enough to be printable. The flexed areas were then exposed to corona effluent for 20 minutes to increase the size of the cracks, if any, into the overcoat. The flexed and exposed areas were then printed for crack assessment. Cracks, if any, appeared as black spots. A rating was assigned to each assessment as follows: 1 being the worst with 70% to 100% of the flexed and exposed areas covered by the black spots, 2 being 40% to 70% covered by the black spots, 3 being 20% to 40%, 4 being 10% to 20% and 5 being less than 10% of the areas covered by the black spots. All exemplary embodiment overcoat samples exhibited acceptable crack resistance with ratings between 3 and 4. For comparison, a non-overcoated control photoreceptor belt, which was tested at the same time as the overcoated samples, was assigned a rating of 3. The overcoated belts of the present disclosure have far superior crack resistance to that of the control belt.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. An overcoat composition comprising:
    a binder component including (i) an acrylated polyol, and (ii) a polypropylene glycol, wherein the weight ratio of the acrylated polyol to the polypropylene glycol ranges from about 1:9 to about 9:1;
    at least one transport agent; and
    at least one crosslinking agent.

2. The overcoat composition of claim 1 wherein the acrylated polyol has a hydroxyl number of from about 10 to about 600.

3. The overcoat composition of claim 2 wherein the acrylated polyol has a hydroxyl number of from about 50 to about 200.

4. The overcoat composition of claim 1 wherein the polypropylene glycol has a molecular weight of from about 100 to about 20,000.

5. The overcoat composition of claim 4 wherein the polypropylene glycol has a molecular weight of from about 400 to about 5,000.

6. The overcoat composition of claim 1 wherein the weight ratio of the acrylated polyol to the propylene glycol ranges from about 2:8 to about 8:2.

7. The overcoat composition of claim 1 wherein the transport agent is selected from the group consisting of (i) a phenolic substituted aromatic amine, (ii) a primary alcohol substituted aromatic amine, and (iii) combinations thereof.

8. The overcoat composition of claim 1 wherein the crosslinking agent includes a methylated, butylated melamine formaldehyde crosslinking agent.

9. The overcoat composition of claim 8 further including an acid catalyst.

10. The overcoat composition of claim 9 wherein the acid catalyst is p-toluenesulfonic acid.

11. An overcoat composition comprising;
    an acrylated polyol having a hydroxyl number of from about 10 to about 600;
    a polypropylene glycol having a molecular weight of from about 100 to about 20,000;
    a transport agent; and
    a crosslinking agent.

12. The overcoat composition of claim 11 wherein the weight ratio of the acrylated polyol to the polypropylene glycol ranges from about 1:9 to about 9:1.

13. The overcoat composition of claim 12 wherein the weight ratio of the acrylated polyol to the polypropylene glycol ranges from about 2:8 to about 8:2.

14. The overcoat composition of claim 11 wherein the acrylated polyol has a hydroxyl number of from about 50 to about 200.

15. The overcoat composition of claim 11 wherein the polypropylene glycol has a molecular weight in the range of from about 400 to about 5,000.

* * * * *